Patented Nov. 28, 1933

1,937,292

UNITED STATES PATENT OFFICE 1,937,292

GYPSUM PLASTER AND PROCESS FOR MAKING SAME

George F. Moore, East Tampa, Fla.

No Drawing. Application August 19, 1932
Serial No. 629,495

12 Claims. (Cl. 106—34)

This invention relates to a gypsum wall plaster as an article of manufacture and the process of making the same.

So-called brown coat plaster or the foundation wall plaster composed of gypsum has frequently heretofore been produced from natural rock gypsum after a single calcination or after the first settle. The present invention aims to provide such a brown coat plaster from a synthetic gypsum, or rather to use the by-product mainly composed of calcium sulphate in the manufacture of phosphoric acid to produce a brown coat plaster.

As an instance, in the manufacture of phosphoric acid from phosphate rock, a gypsum was produced as a by-product which however on account of its impurities did not lend itself to produce a satisfactory brown coat plaster when the process pursued was that heretofore pursued in manufacturing a brown coat plaster from natural rock gypsum with a single calcination.

The present invention also has for an object to provide a new brown coat plaster and the process for manufacturing the same in which a synthetic gypsum is used constituting the by-product of a particular process of manufacturing phosphoric acid. This particular process of manufacturing phosphoric acid consists essentially in using phosphate rock screenings of approximately sixty to sixty-two per cent and containing fifteen to twenty per cent silica or sand as major impurities, grinding the same with weak phosphoric acid, then feeding the slurry to an agitator where the required amount of sulphuric acid is added and then after such digestion and agitation, passing it through two more agitators, resulting in phosphoric acid and a synthetic gypsum as the main products.

This mixture of phosphoric acid and gypsum is then separated by passing the slurry into Dorr thickeners and finally settling and decanting the product as a result of which the bulk of phosphoric acid, approximately ninety-eight per cent, is separated leaving the gypsum as a cake.

This gypsum cake as a by-product after leaving the filter contains approximately sixty per cent calcium sulphate ($CaSO_4.2H_2O$), thirty per cent free moisture, one-half (0.50) per cent phosphoric oxide and ten per cent sand or silica. The gypsum cake is then pumped to a storage pile which is open to the atmosphere. After draining and leaching by drain water, this synthetic gypsum is ready for conversion to commercial gypsum products.

The synthetic gypsum so formed after natural draining and leaching contains after drying (the drying operation removes the free moisture) approximately eighty-five per cent calcium sulphate ($CaSO_4.2H_2O$), and as impurities approximately fifteen per cent sand or silica, one to two per cent insoluble phosphoric oxide, no free phosphoric acid and from one-tenth (0.1) per cent to one-half (0.50) per cent phosphoric oxide combined as mono-phosphoric salts, the chief of which is mono-calcium phosphate.

Another object of the present invention is to produce a brown coat plaster with the synthetic gypsum containing the impurities aforesaid by a single calcination, treated with a suitable retarder and aluminum sulphate and mixing therewith a certain percentage of clay.

Excellent results have been produced when a synthetic gypsum formed as a by-product in the manufacture of phosphoric acid and comprising, after drying, approximately eighty-five parts by weight of calcium sulphate ($CaSO_4.2H_2O$), fifteen parts by weight of sand or silica, one to two parts by weight of insoluble phosphate rock, no free phosphoric acid and from one-tenth (0.1) to one-half (0.50) parts by weight of phosphorus pentoxide combined as mono-phosphoric salts, the chief of which is mono-calcium phosphate, is calcined in a kettle from one to two hours when approximately three-fourths of the combined moisture will have been driven off, resulting in a hemi-hydrate of calcium sulphate, then adding approximately two-fifths (0.40) parts by weight of aluminum sulphate to the resulting product immediately after the calcination is finished and before removing the same from the kettle, then dropping the resulting product from the kettle when the temperature is about three hundred and thirty to three hundred and fifty degrees Fahrenheit and after the resulting product has been screened and placed in storage bins and before the same is ready for bagging, then mixing about fifteen parts by weight of clay to eighty-five parts by weight of the aforesaid resulting product and at about the same time adding about one-fifth (0.20) to three-tenths (0.30) parts by weight of a retarder.

In other words, from the foregoing, it will thus appear that the proportions of the synthetic hemi-hydrate of calcium sulphate, aluminum sulphate, clay and retarder are about as follows: 85 parts by weight of synthetic hemi-hydrate, 0.40 parts by weight of aluminum sulphate, 15 parts by weight of clay, 0.20 to 0.30 parts by weight of the retarder.

The retarder used in this process may be any one of the well known retarders used in the preparation of wall plaster, such for instance as the product of the National Retarder Company.

This synthetic hemi-hydrate is not suitable for making moulding plaster, casting plaster, hard finish plaster and the like primarily on account of its color which is a dark grayish brown.

Furthermore, the synthetic hemi-hydrate is not suitable for the foundation plaster or so-called brown coat plaster unless stimulated with aluminum sulphate as aforesaid or a like sulphate since it loses a great deal of its crystallization properties and therefore a large part of its strength.

However, when aluminum sulphate or the like is added at the end of the first settle at about three hundred and fifty degrees Fahrenheit in the manner above set forth, the calcined material so obtained has not materially decreased its plastic or workable characteristics, that is its ability to be spread by the plasterer on the job and on the other hand produces a plaster that is fifty to seventy-five per cent stronger than the unstimulated material.

It is believed that the aluminum sulphate in this process acts as a crystallizer, probably by forming a double calcium sulphate combination with the calcium sulphate. It is also believed that in this process it acts as a neutralizer in which case it breaks up the soluble phosphates to form an insoluble phosphate and an insoluble sulphate, and consequently the loss in strength attributed to the supposed injurious effects of the soluble phosphates is counteracted and the resulting sulphate formed acts as crystallizers.

Tests have shown that when the aluminum sulphate is added to the synthetic hemi-hydrate as aforesaid after the completion of the first calcination, as compared to a synthetic hemi-hydrate so calcined without the addition of aluminum sulphate a product is produced which possesses a materially increased hardness and a materially increased tensile strength.

It is believed that this is due primarily to the fact that the aluminum sulphate acts as a catalyst to stimulate crystallization and also causes a neutralizing effect to be produced on the soluble phosphates.

It has also been found that excellent results have been obtained when the aluminum sulphate is introduced in about the following manner: After the synthetic hemi-hydrate is calcined to the proper heat in the kettle, approximately three hundred and fifty degrees Fahrenheit, the heat is cut off. A weak solution of aluminum sulphate consisting in the proportion of about one pound of aluminum sulphate to two gallons of water and two-fifths (0.40) parts by weight as compared to eighty-five parts by weight of the synthetic hemi-hydrate is then spread into the resulting product with fairly coarse sprays. The desired solution is effected at the end of a period of about eight to twelve minutes. As soon as the temperature drops to two hundred and seventy to two hundred and fifty degrees Fahrenheit, the spraying is discontinued and the calcined material then dumped immediately into a hot pit. From this pit or bin as aforesaid, the resulting product is screened and then drawn preparatory to bagging when the clay and retarder are added.

From the foregoing, it will thus appear that the process consists essentially in the calcination of a synthetic gypsum compound containing about eighty-five per cent calcium sulphate, ($CaSO_4.2H_2O$), about fifteen per cent sand or silica, $SiO_2$, one to two per cent insoluble phosphate rock or phosphoric oxide, $P_2O_5$, no free phosphoric acid, and from one-tenth (0.1) per cent to one-half (0.5) percent of phosphoric oxide, $P_2O_5$, combined as mono-phosphoric salts, the calcination to continue to first settle where the temperature attained is about three hundred and thirty to three hundred and fifty degrees Fahrenheit, and three-fourths of the moisture has been driven off to form a hemi-hydrate of calcium sulphate ($CaSO_4.\frac{1}{2}H_2O$), thereupon spraying an efflorescent compound, such for instance as aluminum sulphate $Al_2SO_4$ dissolved in water in the proportion of about one pound of aluminum sulphate to two gallons of water and to the extent of about two fifths (0.40) parts by weight and thereupon when ready for bagging the product and after the same has been screened, mixing therewith about fifteen parts by weight of clay and about one-fifth (0.20) to three-tenths (0.30) parts by weight of a retarder, such for instance as the product of the National Retarder Company.

It is obvious that various changes and modifications may be made to the ingredients of the article of manufacture and the steps in the process for making the same without departing from the spirit of the invention as set forth in the appended claims.

I claim:

1. As an article of manufacture, a brown coat plaster formed by mixing calcined synthetic gypsum produced as a by-product of the manufacture of phosphoric acid free from active acid and containing about fifteen parts by weight of silica, about one to two parts by weight of insoluble phosphate rock and from about one-tenth to one-half parts by weight of phosphorus pentoxide combined as monophosphate salts, the chief of which is mono-calcium phosphate, with aluminum sulphate.

2. As an article of manufacture, a foundation plaster composed of calcined synthetic gypsum produced as a by-product of the manufacture of phosphoric acid from phosphate rock free from active acid and containing silica, insoluble phosphate rock and phosphorus pentoxide combined as mono-phosphoric salts, said gypsum being mixed with aluminum sulphate and clay.

3. As an article of manufacture, a foundation plaster composed of calcined synthetic gypsum produced as a by-product of the manufacture of phosphoric acid from phosphate rock free from active acid and containing silica, insoluble phosphate rock and phosphorus pentoxide combined as mono-phosphoric salts, said gypsum being mixed with aluminum sulphate, clay and a retarder.

4. As an article of manufacture, a brown coat plaster composed of aluminum sulphate and a calcined synthetic gypsum forming a by-product of the manufacture of phosphoric acid from phosphate rock free from active acid and containing sand, phosphoric oxide and mono-phosphoric salts.

5. As an article of manufacture, a brown coat plaster composed of aluminum sulphate, clay, a retarder, and a calcined synthetic gypsum forming a by-product of the manufacture of phosphoric acid from phosphate rock free from active acid and containing sand, phosphoric oxide and mono-phosporic salts.

6. As an article of manufacture, a brown coat plaster composed aluminum sulphate and a calcined synthetic gypsum forming a by-product of the manufacture of phosphoric acid from phosphate rock free from active acid containing as impurities at least a soluble phosphate.

7. The process of manufacturing a brown coat plaster consisting in calcining a synthetic gypsum formed as a by-product in the manufacture of phosphoric acid from phosphate rock free from active acid, introducing aluminum sulphate at the end of the first settle, and thereupon adding clay and a retarder.

8. The process of manufacturing a brown coat plaster consisting in calcining to the first settle a synthetic gypsum formed as a by-product in the manufacture of phosphoric acid from phosphate rock free from active acid containing as impurities at least some soluble phosphates, and introducing aluminum sulphate at the end of the first settle.

9. The process of manufacturing a brown coat plaster consisting in calcining a synthetic gypsum formed as a by-product in the manufacture of phosphoric acid from phosphate rock free from active acid to the first settle at about three hundred and thirty degrees to three hundred and fifty degrees Fahrenheit, thereupon introducing aluminum sulphate at the end of the first settle and permitting the same to cool to a temperature of about two hundred and seventy degrees Fahrenheit, and subsequently adding clay and a retarder.

10. The process of manufacturing a brown coat plaster consisting in calcining the gypsum by-product of a phosphoric acid process free from active acid and including a mixture of silica, insoluble phosphate rock and phosphorus pentoxide combined as phosphates to the first settle, thereupon introducing aluminum sulphate at the end of the first settle and while the resulting product is being cooled, and subsequently adding clay and a retarder.

11. The process of manufacturing a brown coat plaster consisting in calcining about eighty-five parts by weight of the gypsum by-product of a phosphoric acid process free from active acid and including a mixture of silica, insoluble phosphate rock and phosphorus pentoxide combined as phosphates to the first settle at about three hundred and thirty to three hundred and fifty degrees Fahrenheit, thereupon introducing about two-fifths parts by weight of aluminum sulphate while permitting the resulting product to cool to a temperature of about two hundred and seventy degrees Fahrenheit, and subsequently adding about fifteen parts by weight of clay and about one fifth to three-tenths parts by weight of a retarder.

12. The process of manufacturing a brown coat plaster consisting in calcining to the first settle about eighty-five parts by weight of a synthetic gypsum formed as a by-product in the manufacture of phosphoric acid from phosphate rock substantially free from active acid and containing as impurities at least fifteen parts by weight of sand, one to two parts by weight of insoluble phosphoric oxide about one-tenth to one-half parts by weight of phosphate rock combined as mono-phosphoric salts, thereupon introducing about two-fifths parts by weight of aluminum sulphate, and thereupon adding fifteen parts by weight of clay and about one-fifth to three-tenths parts by weight of a retarder.

GEORGE F. MOORE.